(12) United States Patent
Poornachandran et al.

(10) Patent No.: US 9,535,559 B2
(45) Date of Patent: Jan. 3, 2017

(54) STREAM-BASED MEDIA MANAGEMENT

(75) Inventors: Rajesh Poornachandran, Portland, OR (US); Gyan Prakash, Beaverton, OR (US); Kannan G. Raja, Beaverton, OR (US); John J. Valavi, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 366 days.

(21) Appl. No.: 13/524,816

(22) Filed: Jun. 15, 2012

(65) Prior Publication Data

US 2013/0339852 A1    Dec. 19, 2013

(51) Int. Cl.
| | |
|---|---|
| *G06F 3/00* | (2006.01) |
| *G06F 3/048* | (2013.01) |
| *G06F 3/0481* | (2013.01) |
| *H04N 21/431* | (2011.01) |
| *H04N 21/44* | (2011.01) |
| *H04N 21/45* | (2011.01) |
| *H04N 21/4782* | (2011.01) |
| *H04N 21/485* | (2011.01) |

(Continued)

(52) U.S. Cl.
CPC ............. *G06F 3/048* (2013.01); *G06F 3/0481* (2013.01); *H04N 21/4312* (2013.01); *H04N 21/44008* (2013.01); *H04N 21/4438* (2013.01); *H04N 21/4532* (2013.01); *H04N 21/4782* (2013.01); *H04N 21/4858* (2013.01)

(58) Field of Classification Search
CPC .... G06F 3/048; G06F 3/0481; H04N 21/4312; H04N 21/44008; H04N 21/4438; H04N 21/4532

USPC .......................................... 715/716, 788–801
See application file for complete search history.

(56) References Cited

U.S. PATENT DOCUMENTS

| | | | |
|---|---|---|---|
| 5,818,441 | A | 10/1998 | Throckmorton et al. |
| 5,838,318 | A | 11/1998 | Porter et al. |

(Continued)

FOREIGN PATENT DOCUMENTS

| | | |
|---|---|---|
| KR | 1020110054418 | 5/2011 |
| WO | 2012027643 | 3/2012 |

OTHER PUBLICATIONS

International Search Report and Written Opinion received for Patent Application No. PCT/US2013/043911, mailed on Oct. 23, 2013.

(Continued)

*Primary Examiner* — Nicholas Augustine
(74) *Attorney, Agent, or Firm* — Grossman, Tucker, Perreault & Pfleger, PLLC

(57) ABSTRACT

The present disclosure provides systems and methods for stream-based media management. A device may be configured to receive information streams including displayable content and to at least display the displayable content. For example, a stream manager in the device may be configured to control how the displayable content is displayed on a display in the device based on activity detected in the information streams. The activity may be defined by user preferences as trigger activities. For example, upon detecting a trigger activity in an information stream, the stream manager may cause the displayable content to be displayed or hidden, may cause the manner in which the displayable content is displayed (e.g., size, shape, order, etc.) to be altered, or may cause a visible or audible alert to be generated.

24 Claims, 6 Drawing Sheets

(51) Int. Cl.
*H04N 21/443* (2011.01)
*G06F 3/01* (2006.01)

(56) References Cited

U.S. PATENT DOCUMENTS

| | | | |
|---|---|---|---|
| 5,874,962 A * | 2/1999 | de Judicibus et al. | 715/789 |
| 7,490,297 B2 * | 2/2009 | Bates et al. | 715/784 |
| 8,713,474 B2 * | 4/2014 | Desai et al. | 715/790 |
| 2001/0047435 A1 | 11/2001 | Dove | |
| 2003/0020671 A1 | 1/2003 | Santoro et al. | |
| 2004/0201608 A1 | 10/2004 | Ma et al. | |
| 2006/0090169 A1 | 4/2006 | Daniels et al. | |
| 2008/0111822 A1 | 5/2008 | Horowitz et al. | |
| 2008/0127272 A1 | 5/2008 | Cragun et al. | |
| 2008/0172617 A1 | 7/2008 | Takeda et al. | |
| 2008/0307360 A1 * | 12/2008 | Chaudhri et al. | 715/835 |
| 2009/0298418 A1 | 12/2009 | Michael et al. | |
| 2009/0303676 A1 * | 12/2009 | Behar et al. | 361/679.27 |
| 2012/0284632 A1 * | 11/2012 | Baird | 715/749 |

OTHER PUBLICATIONS

International Preliminary Report on Patentability and Written Opinion received for PCT Patent Application No. PCT/US2013/043911, mailed on Dec. 24, 2014, 8 pages.
European Search Report from related application EP13804343.5 mailed Feb. 9, 2016.

* cited by examiner

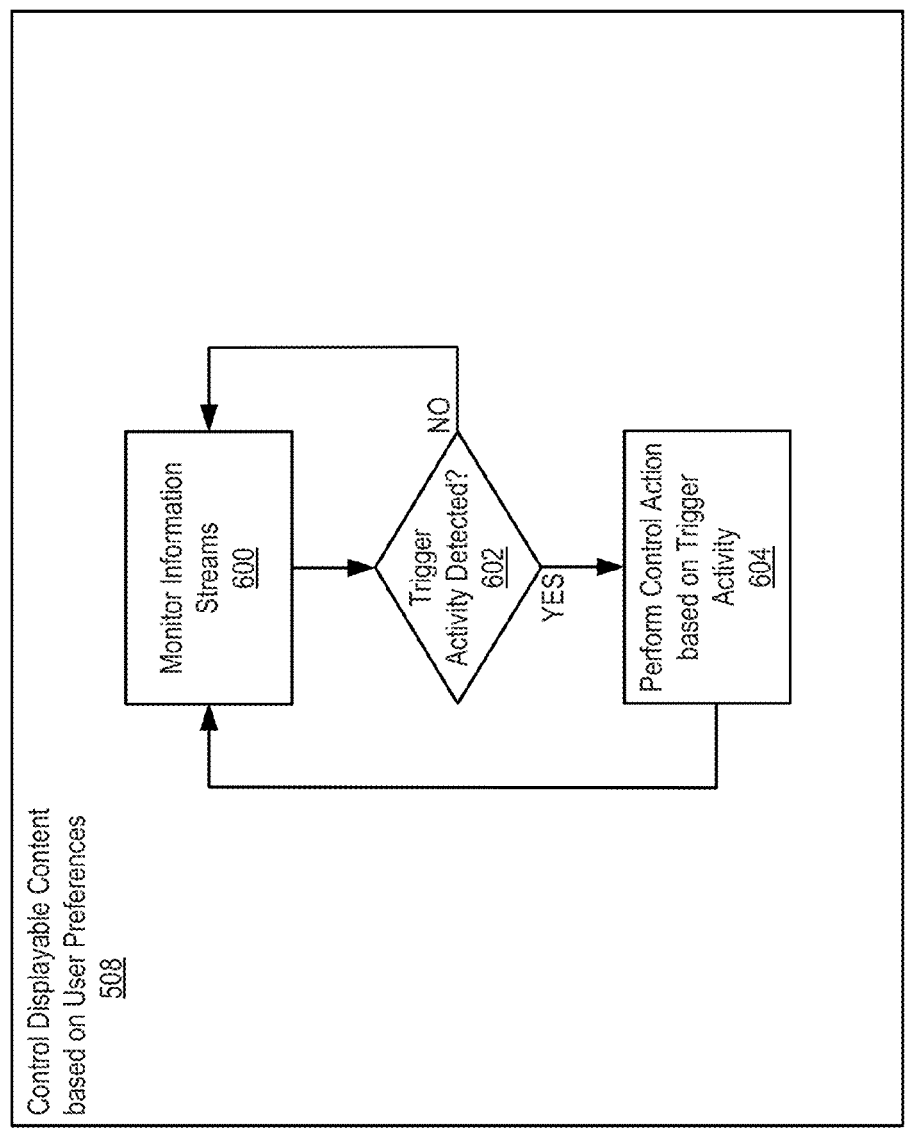

STREAM-BASED MEDIA MANAGEMENT

TECHNICAL FIELD

The present disclosure relates to multiple information stream management, and more particularly, to systems for viewing information from multiple information streams on a device.

BACKGROUND

Electronic communication technology is continuing to evolve, and part of this evolution includes handling tasks that were commonly not orchestrated using electronic communication along with the introduction of new forms of electronic interaction. For example, wired and/or wireless communication technology that is now becoming available in devices may allow for the transmission and reception of various multimedia information including, but not limited to, audio information (e.g., voice interactions such as telephone conversations and teleconferencing, audio streaming, etc.), video information (e.g., videoconferencing, video sharing, video streaming, etc.) and textual information (e.g., email, messaging, etc.). In addition to interaction at the user level, service providers have also employed these forms of communication to facilitate everyday tasks. For example, accessing accounts, paying bills, shopping, requesting customer service, setting up appointments, making reservations, reading the new, monitoring security and many more daily tasks may all be handled electronically through the use of a variety of devices.

At least one result of the evolution of electronic communication technology is a desire for interaction with multiple information streams at the same time. Information streams may include substantially continuous flows of multimedia information that may be transmitted and/or received via wired and/or wireless communication. For example, electronic messaging or email communication, reading news reports or receiving news updates from an online (e.g., Internet) source, reading and/or writing online reviews, blogs, etc., may all constitute textual-based information streams. Likewise, information streams may also include conducting voice-based communications like telephone calls, streaming music, streaming programs, streaming movies, tracking scores from sporting events, interacting with accounts online, performing online searches, viewing Internet web pages, playing online games, etc.

Most importantly, users may desire to interact with some or all of the above information streams simultaneously. Existing picture-in-picture technology was developed to allow multiple television (TV) channels to be viewed concurrently on the same screen. While this technology may perform acceptably for simply viewing multiple TV channels, it falls far short of being able to handle continuously changing information streams comprising multimedia information, often requiring two-way interaction, the information streams being received from various sources not limited to conventional TV feeds, multimedia playback devices, gaming consoles, the Internet and other peripheral input devices like cameras, etc. Moreover, existing technology does not allow users to configure or manage interactions with multiple concurrent information streams.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 6 illustrates a flowchart of example operations for controlling how displayable content is displayed based on the user preferences in accordance with at least one embodiment of the present disclosure.

Figure 1:
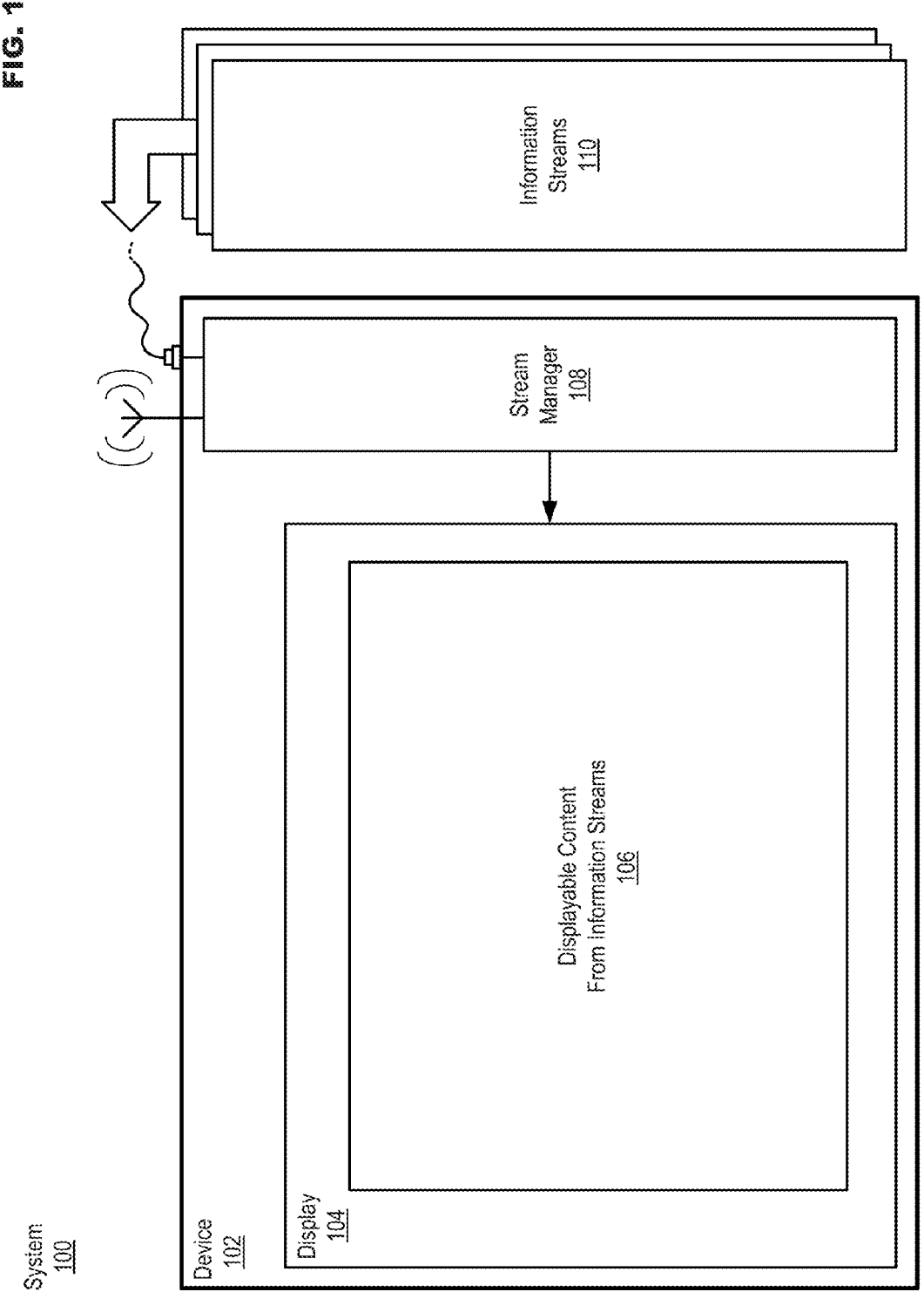
FIG. 1 illustrates an example system configured for stream-based media management in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure describes systems and methods for stream-based media management. In general, a device may receive at least one information stream, and may control how displayable content in the at least one information stream behaves (e.g., whether to display the displayable content, to alter how the displayable content is displayed, to generate a visible or audible alarm to a user, etc.) based on activity in the at least one information stream. In one embodiment, a device may comprise at least a display and a stream manager, the device being configured to interact with at least one information stream. Information streams may comprise substantially continuous flows of multimedia information that may be transmitted from a device, or received at a device, via wired and/or wireless communication. For the sake of explanation herein, all information streams may include at least some displayable content. Displayable content may include, but is not limited to, textual information (e.g., emails, messages, social network status and updates, sports scores, headlines, various content viewed via an Internet browser and other information related to audio/video like album/song titles, lyrics etc.) and video information (e.g., photos, short videos, television programs, movies, live camera feeds, games, etc). In one embodiment, the device may be further configured to monitor the at least one information stream and to display the displayable content based on activity in the at least one information stream. For example, the stream manager may be configured to monitor the at least one information stream and to control how the displayable content is displayed based on detecting the activity.

In one embodiment, upon activation of stream-based media management the device may be configured to detect available information streams and to authenticate the identity of at least one device user. Authentication allows the device to determine if user preferences already exist for at least one current user of the device. If at least one user is authenticated, already existing preferences may be presented to the at least one authenticated user with the option to alter the user preferences. User preferences may include basic configurations for displaying displayable content including, for example, the size of a window in which to display displayable content, a resolution at which to display displayable content, an orientation in which to display displayable content, etc. User preferences may also identify activities (e.g., trigger activities) that, upon detection, may cause device to alter how the displayable content is being displayed and/or to generate an alert. Example trigger activities may include, but are not limited to, detecting incoming information in an information stream (e.g., a new email, message, status update, etc.), detecting important information in an information stream (e.g., an alert regarding an emergency), detecting certain changes in an information stream (e.g., detecting motion in a security camera feed), detecting a quality issue or an interruption in an information stream, etc.

User preferences may further comprise a configuration of an action to perform when a trigger activity is detected. In a basic configuration, detecting a trigger activity may cause the device to display or not display the displayable content. However, it may also be possible for the device to receive a plurality of information streams including displayable content. In such instances the stream manager may be configured to cause displayable content from different information streams in the plurality of information streams to be displayed (e.g., in different locations on the display) and to react to different trigger actions corresponding to each of the plurality of streams. In one embodiment, the action performed in response to the trigger action may cause the stream manager to change how displayable content from one stream is displayed with respect to displayable content from other streams. For example, the stream manager may cause the size or display order of displayable content to change on the display. Changing the display order may cause displayable content from an information stream to be displayed over or in front of displayable content from other information streams. In addition to the trigger actions affecting how displayable content is displayed by the device, visible or audible alerts may be generated corresponding to detected trigger activities. As a result, displayable content from at least one information stream may be displayed, and the manner in which the displayable content is displayed may be based on activities that are occurring in the one or more information streams. FIG. 1 illustrates example system 100 configured for stream-based media management in accordance with at least one embodiment of the present disclosure. System 100 may comprise, for example, device 102 and information streams 110. Examples of device 102 may include, but are not limited to, a mobile communication device such as cellular handset or a smartphone based on the Android® operating system (OS), iOS®, Blackberry® OS, Palm® OS, Symbian® OS, etc., a mobile computing device such as a tablet computer like an iPad®, Galaxy Tab®, Kindle Fire®, etc., an Ultrabook® including a low-power chipset manufactured by Intel Corp., a netbook, a notebook computer, a laptop computer, etc., a typically stationary computing device such as a desktop computer including an integrated or separate monitor, a standalone monitor like a television, a multimedia or videoconferencing system etc. Information streams 110 may comprise at least one flow of information between device 102 and a remote entity. Information streams may include one-way flows such as, but not limited to, conventional television signals received via an antenna, a cable receiver, a satellite receiver, etc., signals received from video recording and playback equipment coupled to device 102 (e.g. video cassette recorders (VCR), digital video recorders (DVR), etc.), signals received from gaming consoles coupled to device 102, audio or video information streamed from a wide area network (WAN) such as the Internet, live camera feeds (e.g., from a closed circuit security system or the Internet), etc. Information flows may also include two-way information flows such as, but not limited to, general textual communication (e.g., email, text messaging, etc.), social networking interactivity, online gaming interactivity and various other interactivity that may be conducted via the Internet. Information streams 110 may be received at device 102 via wired or wireless communication. Various forms of wired and wireless communication will be discussed with respect to device 102 in FIG. 2.

Device 102 may comprise, for example, display 104 and stream manager 108. Display 104 may be based on various technologies such as, for example, cathode ray tube (CRT), liquid crystal (LCD), plasma, light emitting diode (LED), active-matrix organic LED (AMOLED), etc. Display 104 may be configured to display at least displayable content 106 from information streams 110. Stream manager 108 may be configured to monitor information streams 110 received at device 102 and to control how displayable content 106 is displayed on display 104. Streams manager 108 has been illustrated in FIG. 2 as fully incorporated within device 102, such as in the instance of mobile communication or processing device, a web-enabled television, etc. However, it is also possible for some or all of streams manager 108 to be situated in a separate device that is coupled to device 102. Examples of this configuration include, for example, a desktop computer with a separate monitor, a television coupled to a separate processing unit, etc.

While embodiments consistent with the present disclosure will be explained herein using examples with multiple information streams 110 being received by device 102, it is also possible for various embodiments to be employed with a single information stream 110 being received at device 102. Stream manager 108 may control how displayable content 106 from the single information stream 110 is displayed on display 104, and may alter how displayable content 106 is displayed based on activity detected in the single information stream 110. Explanations based on multiple information stream examples are used because some functionality exists in the multiple information stream scenario that may not be applicable to a single information stream.

Figure 2:
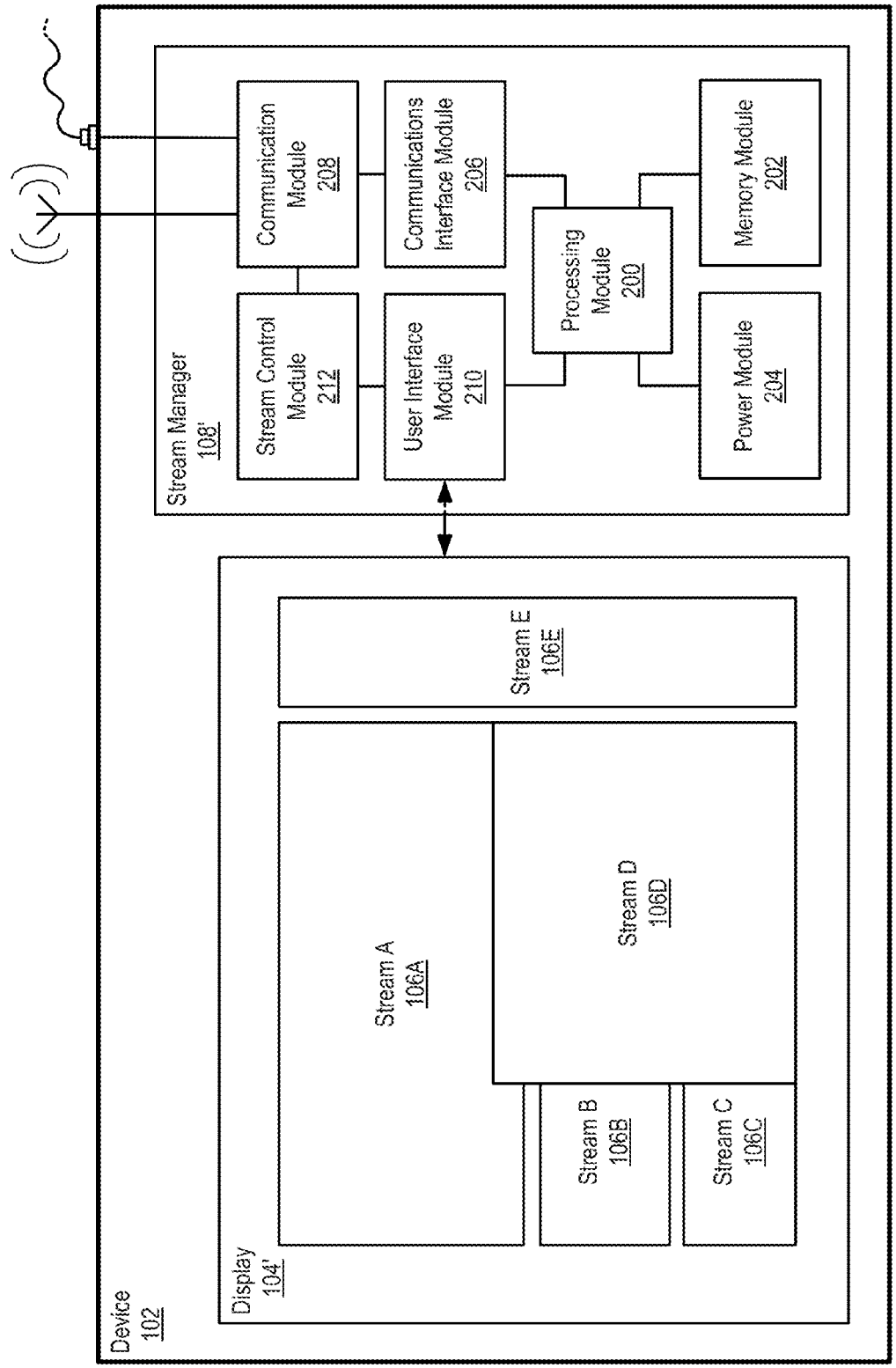
FIG. 2 illustrates an example configuration for a device in accordance with at least one embodiment of the present disclosure.

FIG. 2 illustrates an example configuration for device 102 in accordance with at least one embodiment of the present disclosure. Device 102 in FIG. 2 may comprise display 104' and stream manager 108'. Display 104' is shown in a configuration wherein displayable content 106 from different information streams (e.g., stream A 106A, stream B 106B, stream C 106C, stream D 106D and stream E 106 E, or collectively streams 106A-E) received by device 102 is displayed in different locations of display 104'. Streams 106A-E may be displayed on display 104' in different arrangements such as, for example, adjacent to each other (e.g., grid pattern), overlapping each other, etc. In one embodiment, the arrangement of streams 106A-E may be based on user preferences. For example, stream A 106A may be a television feed, stream B 106B may be a messaging window, stream C 106C may be a social networking window (e.g., Facebook, Google+, MySpace, etc.), stream D 106D may be displaying a console-based or online game and stream E 106E may be displaying a closed-circuit television (CCTV) feed from, for example, a security system for a home, apartment building, etc. The arrangement of streams 106A-E may also change depending on the type of display 104', the activity that is detected in information streams 110, etc., which will be described further with respect to FIGS. 3 and 4.

Streams manager 108' may comprise, for example, processing module 200, memory module 202, power module 204, communication interface module 206, communication module 208, user interface module 210 and stream control module 212. Processing module 200 may comprise one or more processors situated in separate components, or alternatively, may comprise one or more processing cores embodied in a single component (e.g., in a System-on-a-Chip (SOC) configuration). Example processors may include various x86-based microprocessors available from the Intel Corporation including those in the Pentium, Xeon, Itanium, Celeron, Atom, Core i-series product families. Processing module 200 may be configured to execute instructions in device 102'. Instructions may include program code configured to cause processing module 200 to perform activities related to reading data, writing data, processing data, formulating data, converting data, transforming data, etc. Information (e.g., instructions, data, etc.) may be stored in memory module 202. Memory module 202 may comprise random access memory (RAM) or read-only memory (ROM) in a fixed or removable format. RAM may include memory configured to hold information during the operation of device 102' such as, for example, static RAM (SRAM) or Dynamic RAM (DRAM). ROM may include memories such as bios memory configured to provide instructions when device 102' activates, programmable memories such as electronic programmable ROMs, (EPROMS), Flash, etc. Other fixed and/or removable memory may include magnetic memories such as floppy disks, hard drives, etc., electronic memories such as solid state flash memory (e.g., eMMC, etc.), removable memory cards or sticks (e.g., uSD, USB, etc.), optical memories such as compact disc-based ROM (CD-ROM), etc. Power module 204 may include internal power sources (e.g., a battery) and/or external power sources (e.g., electromechanical or solar generator, power grid, etc.), and related circuitry configured to supply device 102' with the power needed to operate.

Communications interface module 206 may be configured to handle packet routing and other control functions for communication module 208, which may include resources configured to support wired and/or wireless communications. Wired communications may include parallel and serial wired mediums such as, for example, Ethernet, Universal Serial Bus (USB), Firewire, etc. Wireless communications may include, for example, close-proximity wireless mediums (e.g., radio frequency (RF), infrared (IR), optical character recognition (OCR), magnetic readers, etc.), short-range wireless mediums (e.g., Bluetooth, wireless local area networking (WLAN), Wi-Fi, etc.) and long range wireless mediums (e.g., cellular, satellite, etc.). In one embodiment, communications interface module 206 may be configured to prevent wireless communications that are active in communication module 208 from interfering with each other. In performing this function, communications interface module 206 may schedule activities for communication module 208 based on, for example, the relative priority of messages awaiting transmission. User interface module 210 may include circuitry configured to allow users to interact with device 102' such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.). For example, user interface module 210 may be configured to interact with at least display 104' as illustrated in FIG. 2.

Stream control module 212 may be configured to control how displayable content 106 (e.g., streams 106A-D) are displayed on display 104' based on activity monitored in information streams 110. In this pursuit, stream control module 212 may be configured to interact with at least communication module 208 and user interface module 210. For example, stream control module 212 may monitor information streams 110 received in device 102 via communication module 208. In one embodiment, the monitoring may be based on user preferences including at least trigger activities. Upon detecting the trigger activities in information streams 110, stream control module 212 may execute control actions to, for example, alter how displayable content 106 (e.g., streams 106A-D) are displayed. Example control actions will be explained further in FIGS. 3 and 4. When executing control actions, stream control module 212 may interact with user interface module 210 to alter the displaying of displayable content 106 (e.g., streams 106A-D). In one embodiment, stream control module 212 may also interact with user interface module 210 to activate stream-based media management in device 102, to authenticate users of device 102, to present existing user preferences to authenticated users, to configured new user preferences, etc.

Figure 3:
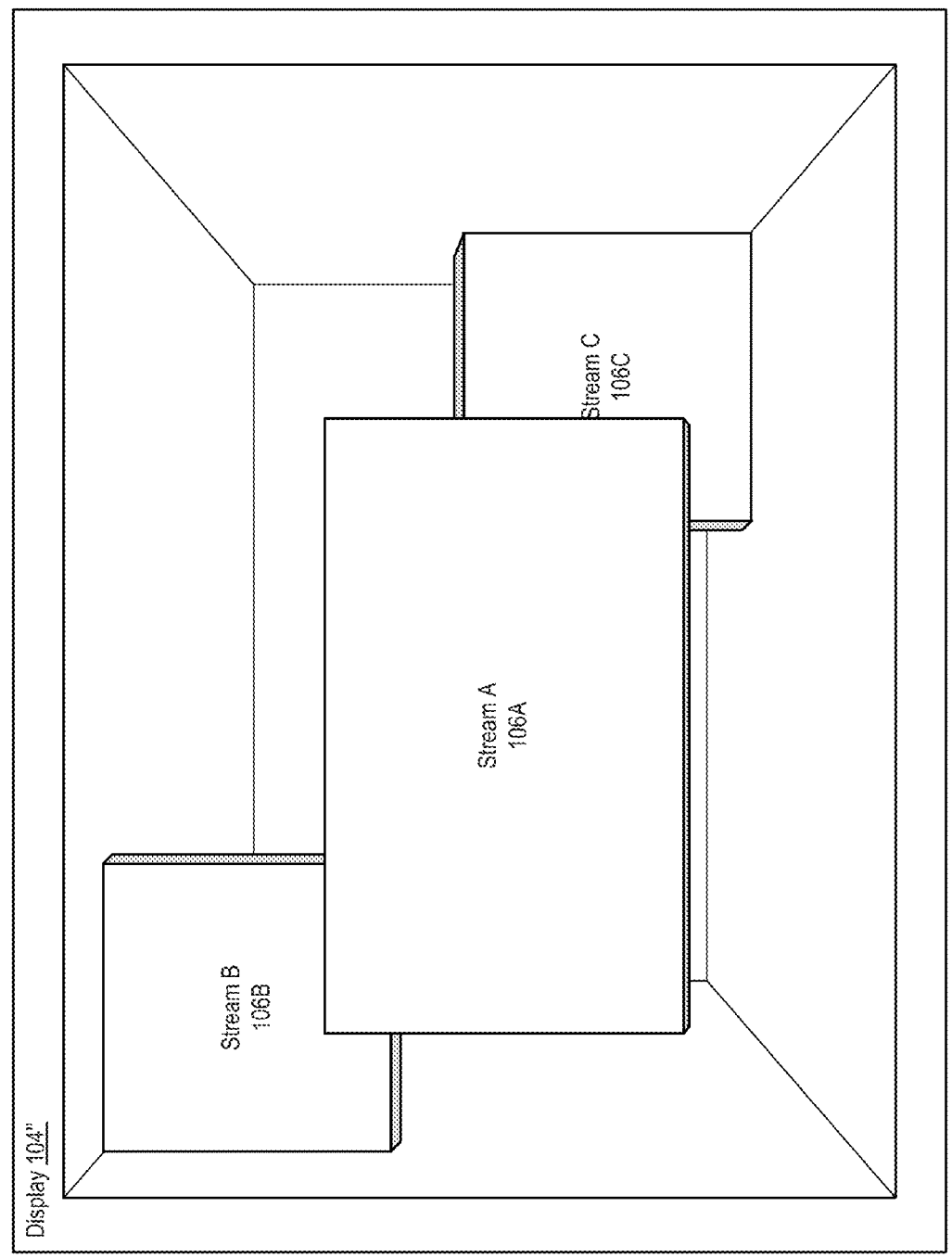
FIG. 3 illustrates an example of a display displaying displayable content from multiple information streams in accordance with at least one embodiment of the present disclosure.

FIG. 3 illustrates an example display 104" displaying displayable content from multiple information streams in accordance with at least one embodiment of the present disclosure. The display illustrated in FIG. 3 is capable of, and configured to, display a three-dimensional (3-D) image. A 3-D image may create the illusion of depth in a two-dimensional (2-D) environment. The example of a 3-D display generating a 3-D image is used merely for the sake of explanation herein. The various embodiments consistent with the present disclosure may be implemented using a two-dimensional (2-D) display, such as in the example display 104' depicted in FIG. 2.

Display 104" is configured in a 3-D display mode in that it imparts a sense of depth to the user of device 102. Display 104" may be, for example, a 3-D television. Display 104" may be configured to display displayable content 106 (e.g., streams 106A-E), and in this example is displaying stream A 104A, stream B 104B and stream C 104C (collectively streams 106A-C). As illustrated in FIG. 3, Stream C 106C may be perceived by a user as being "furthest back" in display 104", while stream A 106A may be perceived by a user as being "closest to the front," of display 104" and stream B 106B may be perceived as being between streams 106A and 106C. In an example of operation, stream A 106A may be of most interest to the user, followed by stream B 106B and stream C 106C. The horizontal and vertical position of streams 106A-C in display 104", the size at which each of streams 106A-C are displayed in display 104", the resolution at which streams 106A-C are displayed in display 104", etc. may be based on user preferences.

Figure 4:
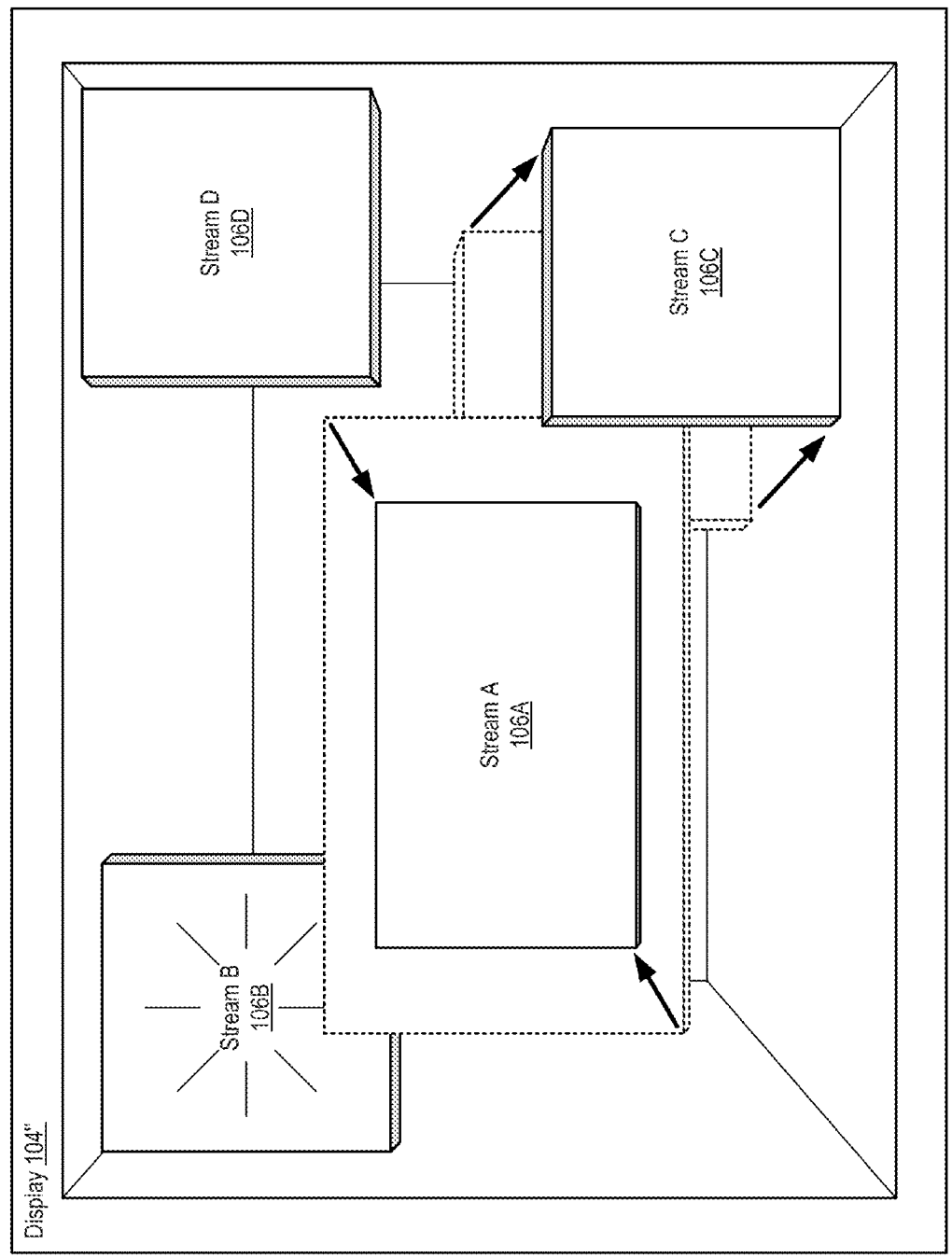
FIG. 4 illustrates example control actions that may be performed in a display displaying displayable content from multiple information streams in accordance with at least one embodiment of the present disclosure.

FIG. 4 illustrates example control actions that may be performed in display 104" displaying displayable content from multiple information streams in accordance with at least one embodiment of the present disclosure. Control actions may be performed when, for example, an activity (e.g., a trigger activity defined in the user preferences) is detected in information streams 110. In an example operation, a trigger activity may have been detected in any of streams 106A-106C, as previously illustrated in FIG. 3, and further in stream D 106D now illustrated in FIG. 4. Initially, stream A 106A shown experiencing a resizing control action. For example, stream A 106A may be disconnected, may be experiencing quality problems, a device or user on the other end of information stream 110 for stream A 106A may be offline, etc., and thus, stream A 106A may be deemphasized on display 104" by, for example, reducing its size. On the other hand, streams 106B and 106C may be experiencing activity such as new information being received, an emergency alert, a request for action by the user, etc., and thus, they may be brought to the attention of the user. Displayable content 106 may be brought to the attention of a user by, for example, creating a visible and or audible alert. In the instance of stream B 106B displayable content 106 may be illuminated, flashing, etc. and possibly accompanied by an audible tone or alarm emitted by device 102. Displayable content 106 may also be emphasized is by changing the display order. For example, stream C 106C is shown in FIG. 4 as moving from the depth in display 104" perceived as furthest from the user to the front of display 104". It is also possible for displayable content to be displayed or not displayed (e.g., hidden) based on activity detected in information streams 110. In FIG. 4 stream D 106D has appeared in response to, for example, activity being detected in the information stream corresponding to stream D 106d including, for example, a new connection being established with a remote device or user, new information being received such as a new communication, an emergency alert, a request for user action, etc. In an example of operation, stream D 106D may correspond to a security camera feed of a door to a user's residence. Stream manager 108 sensing that someone is approaching the door to the user's residence (e.g., sensing a change in the camera feed, receiving an alert from the security camera, etc.) may cause stream D 106D (e.g., the live camera feed) to appear on display 104".

Figure 5:
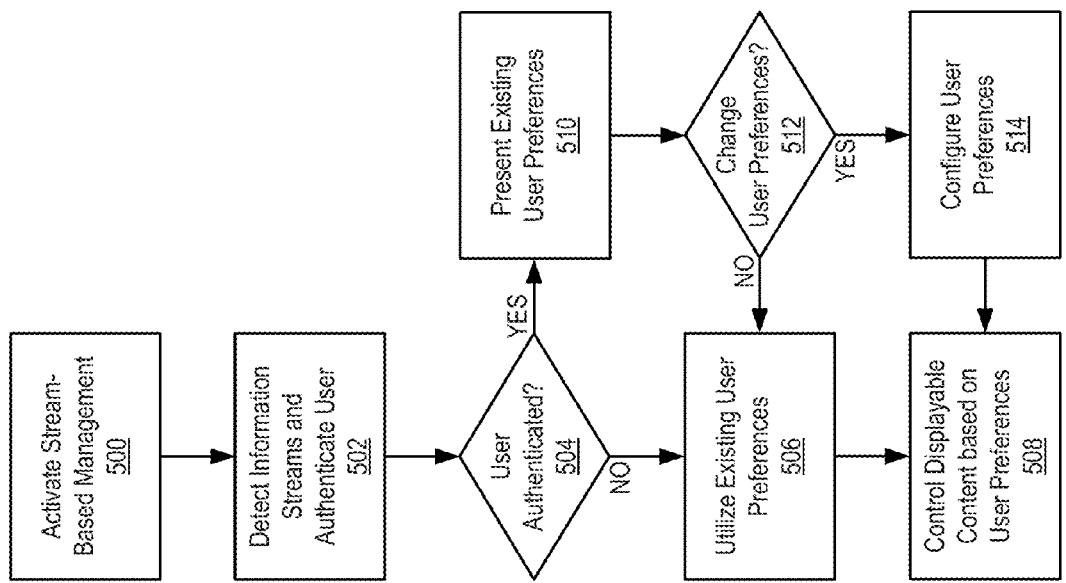
FIG. 5 illustrates a flowchart of example operations for stream-based media management in accordance with at least one embodiment of the present disclosure.

FIG. 5 illustrates a flowchart of example operations for stream-based media management in accordance with at least one embodiment of the present disclosure. In operation 500 stream-based management may be activated in a device. In operation 502 available information streams may be detected and the identity of users may be authenticated. Detecting information streams may include, for example, determining active wired and/or wireless communication connections to the device, followed by determining what information feeds exist on the active communication connections. User authentication may include, for example, determining user identity based on username/password identification, facial recognition identification (e.g., capturing the face of a user via a camera in the device, extracting features from the captured face and then comparing the extracted features to a feature database to determine the user) or any other manner of user identity determination that may be performed by a device to authenticate the identity of a user.

In operation 504 a determination may be made as to whether the identity of the user has been authenticated. If the identity of at least one user cannot be authenticated in operation 504, then in operation 506 already existing user preferences (e.g., a set of default user preferences, user preferences of the last authenticated user, etc.) may be used in operation 508 for controlling how the displayable content is displayed based on the user preferences. Alternatively, if it is determined in operation 504 that a user can be authenticated, then in operation 510 any existing user preferences that are determined to correspond to the authenticated user may be presented. A further determination may then be made in operation 512 as to whether the user desires to change the already existing user preferences. If the authenticated user decides to use the already existing user preferences, then a return to operation 506 may cause the already existing user preferences to be utilized. On the other hand, if in operation 512 the authenticated user determines that the already existing user preferences are to be changed, then in operation 514 the user preferences may be reconfigured. User preferences may include, for example, how displayable content is to be presented on the display of the device, trigger activities corresponding to information streams and control actions that may be performed by the device upon detection of trigger activities.

Operation 514 may be followed by a return to operation 508, wherein the device may control how displayable content is displayed based on the user preferences. FIG. 6 illustrates a flowchart of example operations for controlling how displayable content is displayed based on the user preferences in accordance with at least one embodiment of the present disclosure. In operation 600 the device may monitor information streams for trigger activities. Trigger activities may correspond generally to all information streams (e.g., new information being available in any information stream) or to specific trigger activities may correspond to specific information streams (e.g., when it is a user's turn to make a move in an information stream corresponding to an online game). A determination may then be made in operation 602 as to whether a trigger activity has been detected. The detection of a trigger activity may cause a control action to be performed in operation 604. Control actions may include, for example, causing displayable content to be displayed on the device or to be removed from the display of the device, controlling how displayable content is displayed on the device, causing the device to generate a visible and/or audible alert, etc. In one embodiment, operation 604 may be followed by a return to operation 600 to continue monitoring for trigger activities.

While FIGS. 5 and 6 illustrate various operations according to different embodiments, it is to be understood that not all of the operations depicted in FIGS. 5 and 6 are necessary for other embodiments. Indeed, it is fully contemplated herein that in other embodiments of the present disclosure, the operations depicted in FIGS. 5 and 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eM-MCs), secure digital input/output (SDIO) cards, magnetic or optical cards, or any type of media suitable for storing electronic instructions. Other embodiments may be implemented as software modules executed by a programmable control device.

Thus, the present disclosure provides systems and methods for stream-based media management. A device may be configured to receive information streams including displayable content and to at least display the displayable content. For example, a stream manager in the device may be configured to control how the displayable content is displayed on a display in the device based on activity detected in the information streams. The activity may be defined by user preferences as trigger activities. For example, upon detecting a trigger activity in an information stream, the stream manager may cause the displayable content to be displayed or hidden, may cause the manner in which the displayable content is displayed (e.g., size, shape, order, etc.) to be altered, or may cause a visible or audible alert to be generated.

The following examples pertain to further embodiments. In one example embodiment there is provided a device. The device may include a communication module configured to receive at least one information stream via wired or wireless communication, the information stream including displayable content, a display configured to display at least the displayable content, and a stream manager configured to at least control displaying of the displayable content on the display based on activity in the at least one information stream.

The above example device may be further configured, wherein the stream manager is configured to monitor the at least one information stream for the activity and to cause the displayable content to be displayed or not be displayed based on detecting the activity. In this configuration the example device may be further configured, wherein the stream manager is configured based on user preferences including at least a trigger activity, the stream manager being configured to monitor the at least one information stream for the trigger activity and to control the displaying of the displayable content based on detecting the trigger activity. In this configuration the example device may be further configured, wherein the user preferences further include at least one of a size of a window on the display in which to display the displayable content, the resolution at which to display the displayable content or the orientation in which to display the displayable content.

The above example device may be further configured, wherein the at least one information stream comprises a plurality of information streams including displayable content, the stream manager being configured to control displaying of the displayable content based on activity in the plurality of information streams. In this configuration the above device may be further configured, wherein the stream manager is configured to cause displayable content from different information streams in the plurality of information streams to be displayed in different locations on the display. In this configuration the example device may be further configured, wherein the stream manager is configured to cause a display order of the displayable content from the different information streams to change based on activity in the different information streams. In this configuration the example device may be further configured, wherein the stream manager is configured to cause a display size of the displayable content from the different information streams to change based on activity in the different information streams.

The above example device may be further configured, wherein the stream manager is further configured to cause the device to generate a visible or auditory alert based on the activity.

In another example embodiment there is provided a method. The method may include receiving at least one information stream including displayable content, determining user preferences, determining an activity based on the user preferences, and controlling how the displayable content is displayed based on detecting the activity in the at least one information stream.

The above example method may be further configured, wherein determining user preferences comprises authenticating a user, determining whether user preferences already exist corresponding to the authenticated user, presenting any already existing user preferences to the authenticated user, and allowing the authenticated user to alter the already existing user preferences.

The above example method may be further configured, wherein determining at least an activity based on the user preferences comprises identifying a trigger activity defined in the user preferences. In this configuration the example method may be further configured, wherein the user preferences further include at least one of a size of a window in which to display the displayable content, the resolution at which to display the displayable content or the orientation in which to display the displayable content.

The above example method may be further configured, wherein controlling how the displayable content is displayed further comprises displaying or not displaying the displayable content based on detecting the activity.

The above example method may be further configured, wherein the at least one information stream comprises a plurality of information streams configured to provide displayable content, an activity being determined for each of the plurality of information streams based on the user configuration. In this configuration the example method may be further configured, wherein controlling how the displayable content is displayed further comprises causing displayable content from different information streams in the plurality of information streams to be displayed in different locations based on the user preferences. In this configuration the example method may be further configured, wherein controlling how the displayable content is displayed further comprises causing a display order of the displayable content from the different information streams to change based on at least one activity being detected in the different information streams. In this configuration the example method may be further configured, wherein controlling how the displayable content is displayed further comprises causing a display size of the displayable content from the different information streams to change based on at least one activity being detected in the different information streams.

The above example method may be further configured, further comprising causing a visible or auditory alert to be generated based on detecting the activity.

In another example embodiment there is provided a system comprising at least a device configured to receive information feeds, the system being arranged to perform any of the above example methods.

In another example embodiment there is presented a chipset arranged to perform any of the above example methods.

In another example embodiment there is presented at least one machine readable medium comprising a plurality of instructions that, in response to be being executed on a computing device, cause the computing device to carry out any of the above example methods.

In another example embodiment there is provided a device comprising at least a display and a stream manager, the device being arranged to perform any of the above example methods.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A television display device, comprising:
   communication circuitry configured to receive a plurality of information streams from at least one remote entity via wired or wireless communication, the plurality of information streams including a first information stream and a second information stream, said first information stream being in a first format and comprising first displayable content and said second information stream being in a second format that is different from the first format and comprising second displayable content;
   a display configured to display at least the first and second displayable content; and
   a stream manager configured to:
      authenticate a user of said television display device;
      identify a user profile associated with an authenticated user of said television display device, said user profile comprising user preferences for the display of content on said display;
      allocate, in accordance with said user preferences, a first window within the display for the display of the first displayable content and a second window within the display for the display of the second displayable content;
      concurrently display the first displayable content and the second displayable content within the first and second windows, respectively; and
      monitor activity in the first and second information streams for the occurrence of at least one trigger activity;
   wherein:
      the at least one trigger activity is selected from the group consisting of incoming information content in at least one of said first and second information streams, alert information in at least one of said first and second information streams, changes in at least one of said first and second information streams, a quality issue in at least one of said first and second information streams, or an interruption in at least one of said first and second information streams; and
      in response to detection of said at least one trigger activity, the stream manager is configured, based on a type of detected trigger activity and said user preferences, to alter the display of said first and second displayable content by adjusting at least one of the size, resolution, orientation, and location of at least one of said first window and said second window relative to one another.

2. The device of claim 1, wherein the stream manager is further configured, based on said type of detected trigger activity and said user preferences, to adjust the location of said first window, said second window, or a combination thereof.

3. The device of claim 2, wherein adjusting said location comprises changing a display order of said first window, said second window, or a combination thereof.

4. The device of claim 2, wherein the stream manager is configured to at least adjust a size of the first window, a size of the second window, or a combination thereof in response to detection of said at least one trigger activity.

5. The device of claim 1, wherein the stream manager is further configured to cause the television display device to generate a visible or auditory alert in response to detection of said at least one trigger activity.

6. A method, comprising:
   receiving, with a television display device, a plurality of information streams from at least one remote entity via wired or wireless communication, the plurality of information streams comprising a first information stream and a second information stream, the first information stream being in a first format and comprising first displayable content, the second information stream being in a second format that is different from the first format and comprising second displayable content;
   with a stream manager of said television display device:
      authenticating a user of said television display device;
      identifying a user profile associated with an authenticated use of said television display device, said user profile comprising user preferences for the display of content on a display of said television display device;
      allocating, in accordance with said user preferences, a first window within the display for the display of the first displayable content and a second window within the display for the display of the second displayable content;
      concurrently displaying the first displayable content and the second displayable content within the first and second windows, respectively; and
      monitoring activity in the first and second information streams for the occurrence of at least one trigger activity;
   wherein:
      the at least one trigger activity is selected from the group consisting of incoming information content in at least one of said first and second information streams, alert information in at least one of said first and second information streams, changes in at least one of said first and second information streams, a quality issue in at least on o said first and second information streams, or an interruption in at least one of said first and second information streams; and in response to detection of said at least one trigger activity, the method further comprises adjusting, with said stream manager, at least one of the size, resolution, orientation, and location of at least one of said first window and said second window relative to one another, based on a type of detected trigger activity and said user preferences.

7. The method of claim 6, further comprising, with said stream manager, emphasizing or deemphasizing the first or second window at least in part by adjusting the location of said first window, said second window, or a combination thereof based on said type of detected trigger activity and said user preferences.

8. The method of claim 6, further comprising, with said stream manager, emphasizing or deemphasizing the first or second window, at least in part by displaying or not displaying the first window, the second window, or a combination thereof based on said type of detected trigger activity and said user preferences.

9. The method of claim 6, further comprising, with said stream manager, emphasizing or deemphasizing the first or second window at least in part by independently adjusting the display of the first and second windows on the display based at least in part on said type of detected trigger activity and said user preferences.

10. The method of claim 6, further comprising, with said stream manager, emphasizing or deemphasizing the first or second window at least in part by adjusting an orientation of the first window, the second window, or a combination thereof based on said type of detected trigger activity and said user preferences.

11. The method of claim 6, further comprising, with said stream manager, emphasizing or deemphasizing the first or second window at least in part by adjusting a display order of said first window, said second window, or a combination thereof based on said type of detected trigger activity and said user preferences.

12. The method of claim 6, further comprising, with said stream manager, emphasizing or deemphasizing the first or second window at least in part by adjusting a size of the first window, a size of the second window, or a combination thereof based on said type of detected trigger activity and said user preferences.

13. The method of claim 6, further comprising, with said stream manager, causing a visible or auditory alert to be generated based on said type of detected trigger activity and said user preferences.

14. A system comprising at least one machine-readable non-transitory storage medium having stored thereon, individually or in combination, instructions that when executed by one or more processors result in the following operations comprising:

receiving, with a television display device, a plurality of information streams from at least one remote entity via wired or wireless communication, the plurality of information streams comprising a first information stream and a second information stream, the first information stream being in a first format and comprising first displayable content, the second information stream being in a second format that is different from the first format and comprising second displayable content;

with a stream manager of said television display device:
authenticating a user of said television display device;
identifying a user profile associated with an authenticated use of said television display device, said user profile comprising user preferences for the display of content on a display of said television display device;

allocating, in accordance with said user preferences, a first window within the display for the display of the first displayable content and a second window within the display for the display of the second displayable content;

concurrently displaying the first displayable content and the second displayable content within the first and second windows, respectively; and monitoring activity in the first and second information streams for the occurrence of at least one trigger activity;

wherein:
the at least one trigger activity is selected from the group consisting of incoming information content in at least one of said first and second information streams, alert information in at least one of said first and second information streams, changes in at least one of said first and second information streams, a quality issue in at least on o said first and second information streams, or an interruption in at least one of said first and second information streams; and in response to detection of said at least one trigger activity, the method further comprises adjusting, with said stream manager, at least one of the size, resolution, orientation, and location of at least one of said first window and said second window relative to one another, based on a type of detected trigger activity and said user preferences.

15. The system of claim 14, further comprising, with said stream manager, emphasizing or deemphasizing the first or second window at least in part by adjusting the location of said first window, said second window, or a combination thereof based on said type of detected trigger activity and said user preferences.

16. The system of claim 14, further comprising, with said stream manager, emphasizing or deemphasizing the first or second window, at least in part by displaying or not displaying the first window, the second window, or a combination thereof based on said type of detected trigger activity and said user preferences.

17. The system of claim 14, further comprising, with said stream manager, emphasizing or deemphasizing the first or second window at least in part by independently adjusting the display of the first and second windows on the display based at least in part on said type of detected trigger activity and said user preferences.

18. The system of claim 14, further comprising, with said stream manager, emphasizing or deemphasizing the first or second window at least in part by adjusting an orientation of the first window, the second window, or a combination thereof based on said type of detected trigger activity and said user preferences.

19. The system of claim 14, further comprising, with said stream manager, emphasizing or deemphasizing the first or second window at least in part by adjusting a display order of said first window, said second window, or a combination thereof based on said type of detected trigger activity and said user preferences.

20. The system of claim 14, further comprising, with said stream manager, emphasizing or deemphasizing the first or second window at least in part by adjusting a size of the first window, a size of the second window, or a combination thereof based on said type of detected trigger activity and said user preferences.

21. The system of claim 14, further comprising, with said stream manager, causing a visible or auditory alert to be generated based on said type of detected trigger activity and said user preferences.

22. The display device of claim 1, wherein at least one of the first format and the second format is a television signal.

23. The method of claim 6, wherein at least one of the first format and the second format is a television signal.

24. The system of claim 14, wherein at least one of the first format and the second format is a television signal.

* * * * *